US009747246B2

United States Patent
Deng

(10) Patent No.: US 9,747,246 B2
(45) Date of Patent: Aug. 29, 2017

(54) ELECTRONIC DEVICE FOR COMMUNICATING BETWEEN A MICROCONTROLLER UNIT (MCU) AND A HOST PROCESSOR AND RELATED METHODS

(71) Applicant: STMICROELECTRONICS, INC., Coppell, TX (US)

(72) Inventor: Brian Deng, Richardson, TX (US)

(73) Assignee: STMicroelectronics, Inc., Coppell, TX (US)

( * ) Notice: Subject to any disclaimer, the term of this patent is extended or adjusted under 35 U.S.C. 154(b) by 268 days.

(21) Appl. No.: 14/625,196

(22) Filed: Feb. 18, 2015

(65) Prior Publication Data

US 2016/0239456 A1    Aug. 18, 2016

(51) Int. Cl.
  *H05K 7/10*    (2006.01)
  *G06F 13/42*    (2006.01)
  *G06F 13/362*    (2006.01)

(52) U.S. Cl.
  CPC ........ *G06F 13/4282* (2013.01); *G06F 13/362* (2013.01); *Y02B 60/1228* (2013.01); *Y02B 60/1235* (2013.01)

(58) Field of Classification Search
  CPC ............................ G06F 13/4282; G06F 13/362
  USPC ........................................................ 710/301
  See application file for complete search history.

(56) References Cited

U.S. PATENT DOCUMENTS

| 2006/0020855 | A1* | 1/2006 | Okada | G06F 11/1441 714/14 |
| 2008/0059668 | A1* | 3/2008 | Charrat | G06F 13/4243 710/110 |
| 2010/0169687 | A1* | 7/2010 | Kimura | G06F 1/3221 713/324 |
| 2016/0041831 | A1* | 2/2016 | Carmeli | G06F 9/4418 710/106 |

\* cited by examiner

*Primary Examiner* — Chun-Kuan Lee
(74) *Attorney, Agent, or Firm* — Slater Matsil, LLP

(57) ABSTRACT

An electronic device may include system and serial peripheral interface (SPI) clocks, and a host interface each switchable between active and inactive states, a serial controller coupled to the system clock, and a memory. A slave controller may generate a request active signal based upon a transaction request from a host and causing each of the system clock, SPI clock, and host interface into the active state, store request data in the memory, and switch the host interface to the inactive state based upon the request data being stored. The serial controller may process the request based upon the request active signal, and generate a request complete signal based upon the request being processed. The slave controller may switch the system clock to the inactive state based upon the request complete signal. The SPI clock may be switched to the inactive state based upon the request complete signal.

20 Claims, 5 Drawing Sheets

ELECTRONIC DEVICE FOR COMMUNICATING BETWEEN A MICROCONTROLLER UNIT (MCU) AND A HOST PROCESSOR AND RELATED METHODS

FIELD OF THE INVENTION

The present invention relates to the field of electronics, and, more particularly, to serial peripheral interface (SPI) communication devices and related methods.

BACKGROUND

A processor may communicate with a peripheral device through an interface or bus. For example, a host processor may communicate with a microcontroller based device through a peripheral device interface bus. An example of a peripheral interface bus is a serial peripheral interface (SPI) bus. An SPI bus is a type of is a synchronous serial communications device used for relatively short distance communications. For example, an SPI bus may be used to communicate with sensors, memory cards, and or embedded systems.

In some applications, however, using an SPI bus, data transfer control may be increasingly difficult, for example, with burst data. Moreover, as more electronic devices that may include an SPI device are portable and powered by a battery, for example, power consumption of the electronic devices may be of a particular interest.

SUMMARY

An electronic device for communicating between a microcontroller unit (MCU) and a host processor may include a system clock configured to be switchable between an active state and an inactive state and a serial peripheral interface (SPI) clock configured to be switchable between an active state and an inactive state. The electronic device may also include a serial bridge controller coupled to the system clock, a serial bus memory coupled to the SPI clock, and a host serial interface coupled to the serial bus memory and configured to be switchable between an active state and an inactive state. An SPI slave controller may be coupled to the serial bus memory, the host serial interface, and the SPI clock. The SPI slave controller is configured to generate a request active signal based upon a request for the transaction from the host processor, the request active signal causing each of the system clock, the SPI clock, and the host serial interface into the active state, store, based upon the request active signal, data corresponding to the request for the transaction from the host processor to the MCU in the serial bus memory, and switch the host serial interface to the inactive state based upon the data corresponding to the request for the transaction being stored. The serial bridge controller may be configured to process the request for the transaction based upon the request active signal, and generate a request complete signal based upon the request for the transaction being processed. The SPI slave controller may be configured to switch the system clock to the inactive state based upon the request complete signal. The SPI clock may be switched to the inactive state based upon the request complete signal. Accordingly, the electronic device may increase communications efficiency using an SPI bus, for example, by reducing power consumption and providing increased management efficiency of the communications between the host device and the MCU.

The clock may be switched to the inactive state based upon there being no further request for a transaction from the host processor, for example. The serial bridge controller may include a plurality of sequential logic circuits coupled together and configured to generate the request complete signal based upon the request active signal and the system clock.

The serial bridge controller may include delay circuitry configured to cooperate with the SPI slave controller to delay switching the system clock to the inactive state. The delay circuitry may include a system clock divider and a delay counter coupled thereto, for example. The system clock divider may include a divide by X system clock divider, wherein X is a delay of the switching of the system clock to the inactive state in terms of system clock cycles, for example. The delay circuitry may be configured to delay switching the system clock to the inactive state by a delay of greater than two clock cycles of the system clock.

The SPI slave controller may include a plurality of sequential logic circuits coupled together. The serial bridge controller may be configured to process the request for the transaction based upon reading the request for the transaction from the serial bus memory, for example.

A method aspect is directed to a method of communicating between a microcontroller unit (MCU) and a host processor. The method includes using a serial peripheral interface (SPI) slave controller coupled to a serial bus memory, a host serial interface, and an SPI clock coupled to the serial bus memory to generate a request active signal based upon a request for a transaction from the host processor. The request active signal causes each of a system clock coupled to a serial bridge controller, the SPI clock, and the host serial interface into an active state. The SPI slave controller is used to store, based upon the request active signal, data corresponding to the request for the transaction from the host processor to the MCU in the serial bus memory, and switch the host serial interface to an inactive state based upon the data corresponding to the request for the transaction being stored. The serial bridge controller is used to process the request for the transaction based upon the request active signal, and generate a request complete signal based upon the request for the transaction being processed. The SPI slave controller is further used to switch the system clock to the inactive state based upon the request complete signal. The SPI clock may be switched to the inactive state based upon the request complete signal.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
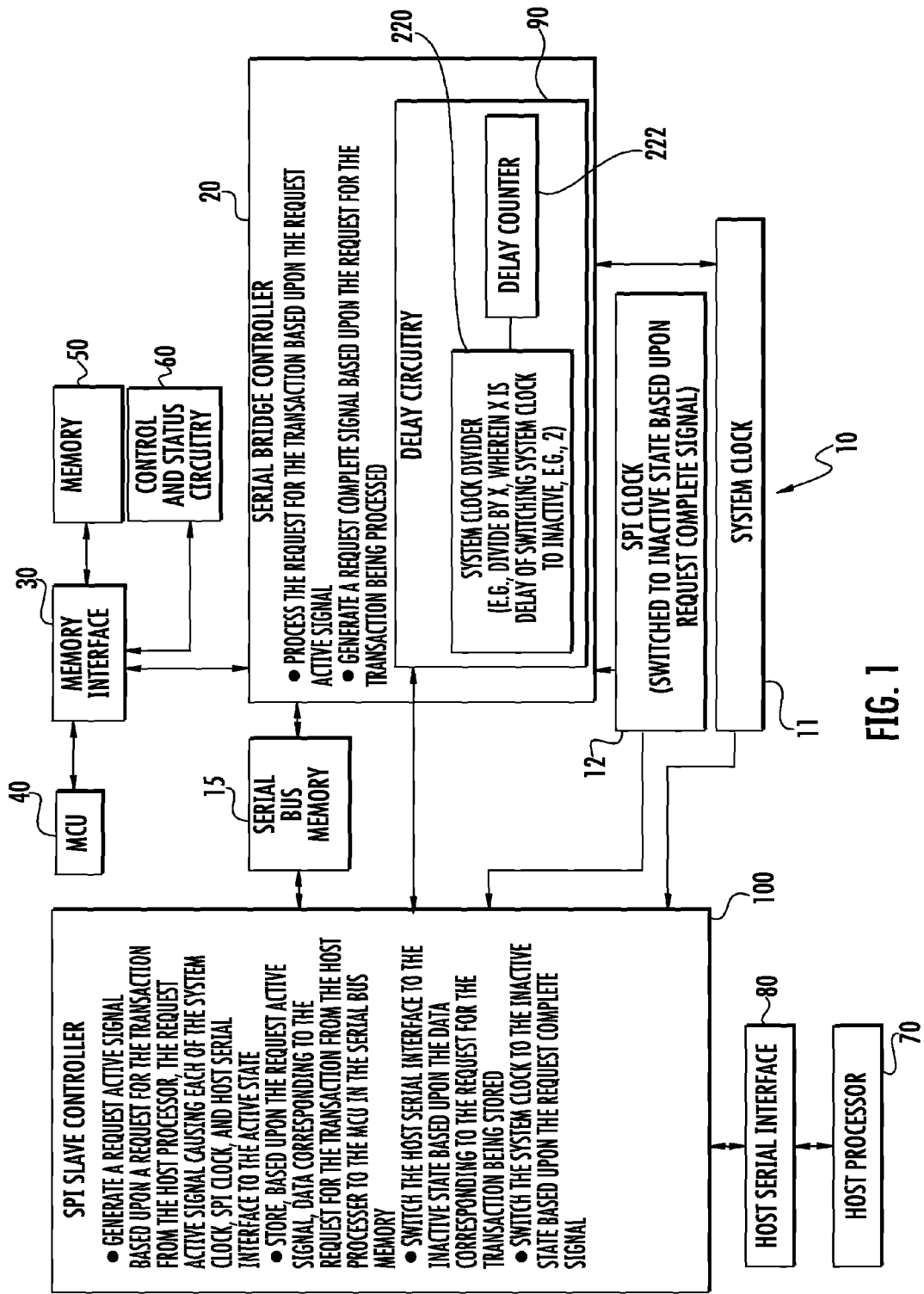
FIG. 1 is a schematic block diagram of an electronic device in accordance with an embodiment of the present invention.

Referring initially to FIG. 1, an electronic device 10 for communicating between a microcontroller unit (MCU) 40 and a host processor 70 illustratively includes a system clock 11 configured to be switchable between an active state and an inactive state, and a serial peripheral interface (SPI) clock 12 also configured to be switchable between an active state and an inactive state. The system clock 11 is off or shut down when there is no activity, as will be appreciated by those skilled in the art, and as will be described in further detail below.

The electronic device 10 also includes a serial bridge controller 20 coupled to the system clock 11. A serial bus memory 15, for example serial bus registers, is coupled to the SPI clock 12.

A host serial interface 80 is coupled to the serial bus memory 15. The host serial interface 80 is configured to be switchable between an active state and an inactive state.

The electronic device 10 also includes an SPI slave controller 100 coupled to the serial bus memory 15, the host serial interface 80, and the SPI clock 12. The SPI slave controller is configured to generate a request active signal based upon a request for the transaction from the host processor 70. The request active signal causes each of the system clock 11, the SPI clock 12, and the host serial interface 80 into the active state. The SPI slave controller is also configured to store, based upon the request active signal, data corresponding to the request for the transaction from the host processor 70 to the MCU 40 in the serial bus memory 15, and switch the host serial interface 80 to the inactive state based upon the data corresponding to the request for the transaction being stored.

The serial bridge controller 20 configured to process the request for the transaction based upon the request active signal, and generate a request complete signal based upon the request for the transaction being processed.

The SPI slave controller 100 is configured to switch the system clock 11 to the inactive state based upon the request complete signal. The SPI clock 12 is also switched to the inactive state based upon the request complete signal.

Illustratively, the serial bridge controller 20 interfaces with the MCU 40 through a memory interface 30 which is coupled to the MCU, a memory 50 and control and status circuitry 60. The MCU 40 may be an 8051 MCU, for example. The memory 50 may include, in an example embodiment, multiple memories or memory blocks including a 12 KB EEPROM, a 32 KB ROM, and a 256 byte DPRAM. Of course, other and/or additional memories or memory blocks may be included in the memory 50. The control and status circuitry 60 may include analog-to-digital converter (ADC) circuitry including control, status, and ADC conversion result data.

The SPI slave controller 100 and the serial bus memory 15 operate based upon the SPI clock 12. The rest of the blocks operate based upon the system clock 11. The system clock 11 shuts down when there is no activity.

As will be described in further detail below, if the host processor 70 does not initiate an SPI transaction, for example, the host serial interface 80 is idle or inactive, the SPI clock 12 is inactive, and the system clock 11 is also inactive. This may reduce power consumption.

Figure 2:
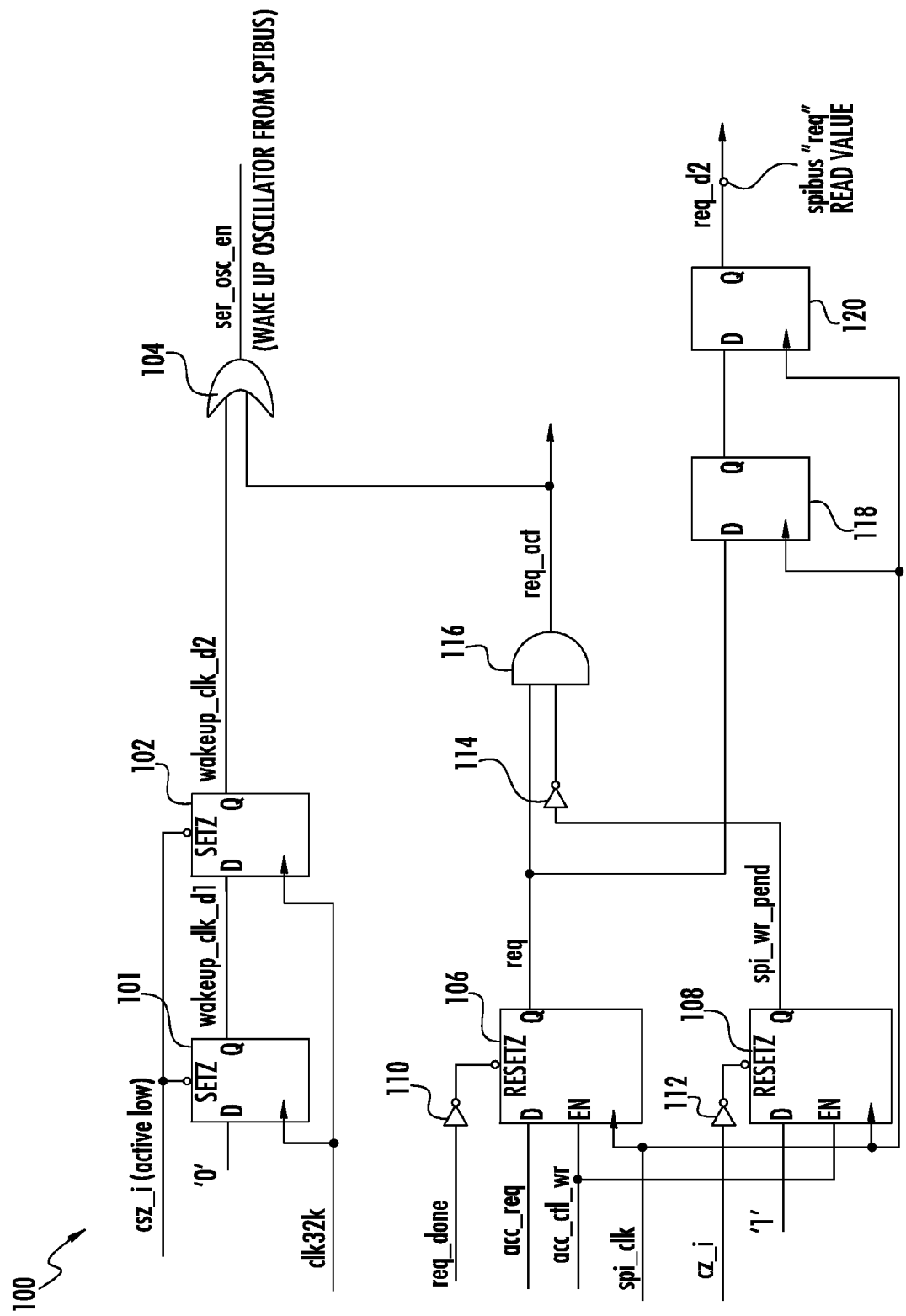
FIG. 2 is a schematic circuit diagram of a portion of the SPI slave controller of FIG. 1.

Referring now additionally to FIG. 2, the different components of the electronic device 10 and operation thereof will now be described. When the host processor 70 initiates an SPI transaction csz_i (chip select, active low) is low, and csz_i asynchronously sets the output of sequential logic circuits, particularly, the output of flip-flop 101 (wakeup_clk_d1) and the output of flip-flop 102 (wakeup_clk_d2) to 1. The output of flip-flop 102 is connected to an input of a two input OR gate 104. The output of the OR gate 104 (ser_osc_en) is used to asynchronously wake up the system clock 11 from the SPI bus to allow processing of the host processor request.

When the host processor 70 initiates an SPI transaction, it will burst write the request information to serial bus memory 15 for delivery. In particular, for a write request from the host processor 70, the serial bus memory address 00h is written with system address bits 15-8, and address 01h is written with system address bits 7-0, the command register (address=02h) is written with a read or write request indication, memory or register access, and transfer byte count data, and address 03h-06h is written with write data which is loaded into the write data buffer. For a read request from the host processor 70 read request, serial bus memory address 00h-02h is written with system address and command register data.

When the host processor 70 is writing to the command register (address=02h), the req bit (bit 3 of command register) is set to 1. At the write to command register cycle, acc_req=1, acc_ctl_wr=1, and the rising edge of spi_clk (SPI clock 12) sets the output of flip-flop 106 req to 1. Req is one input of a two input AND gate 116. The output of the AND gate 116 req_act is also used to maintain the system clock 11 in the enable state (i.e., running). Req_act corresponds to whether the host processor request phase is active. Req_act is temporarily disabled by spi_wr_pend (i.e., the output of the flip-flop 108). When the host processor 70 finishes writing to the command register, it sets req to 1 and the output of flip-flop 108 spi_wr_pend to 1. Spi_wr_pend is used to disable req_act from becoming or being set to 1. When spi_wr_pend is 1, it is inverted to 0 through an inverter 114, so the output of the AND gate 116 output is 0. SPI_wr_pend corresponds to whether the SPI write operation is in process and not yet finished, so that req_act is not yet set to 1.

When the host processor 70 finishes the write operation to deliver request information, it release chip select (csz_i) to 1. When csz_i is 1, the output of the inverter 112 asynchronously resets the output of flip-flop 108 spi_wr_pend to 0. When spi_wr_pend is 0, inverter 114 output is 1, and the output of the AND gate 116 req_act is set to 1. Req_act is sent to the serial bridge controller 20 to initiate a request phase to the system clock 11.

When host processor 70 ends an SPI transaction after delivery of request data, Csz_i goes high (not active). When the output of the OR gate 104 ser_osc_en is 1, the system clock 11 is enabled. When the system clock 11 is running or active, and there is some delay in time, both the system clock 11 (sys_clk and sys_clk_ana_i) (e.g., a 4 MHz clock which may be the frequency of system clock) and cLk32K (e.g., divided down 32 KHz clock) are active or running.

When a write transaction to deliver a memory or register read or write request is finished, csz_i goes high and the host serial interface 80 goes into the idle state. After two clk32K (32 KHz clock) cycles, the output of flip-flop 102 wakeup_clk_d2 is 0, and its oscillator enable function is disabled. The output of OR gate 104 ser_osc_en (serial bus oscillator clock enable) is still 1 (active), because req_act is 1.

When req_act is set to 1, the host processor 70 sends a memory or register read or write request to serial bridge controller 20. The serial bridge controller 20 processes the request. After it finishes the request, the serial bridge controller 20 sets req_done (request done) to 1 for one sys_clk cycle. When req_done is 1, the serial bridge controller 20 asynchronously resets the output of flip-flop 106 req to 0 through inverter 110. When req is 0, the output of AND gate 116 req_act is 0. Req_act is 0 which makes the output of OR gate 104 ser_osc_en set to 0. Ser_osc_en is 0, which shuts down the system clock 11 after a four clk32K (32 KHz clock) clock cycle delay.

There is synchronizer logic to make the output of flip-flop 106 req synchronize with the SPI clock 12. The synchronization goes through flip-flop 118 and flip-flop 120. The output of flip-flop 120 req_d2 is the SPI bus req read value. The host processor 70 reads the command register (serial bus register address=02h) bit 3 (req). If the req read value is 0, the request is done. If the host processor 70 sends a read request, the read data is stored in rd_buf1-rd_buf4.

The serial bridge controller 20 includes delay circuitry 90, which includes a system clock divider 220 and a delay counter 222 coupled thereto. The system clock divider 220 may be in the form of a divide by X system clock divider, wherein X is a delay of the switching of the system clock 11 to the inactive state in terms of system clock cycles, as will be explained in further detail below.

Figure 3:
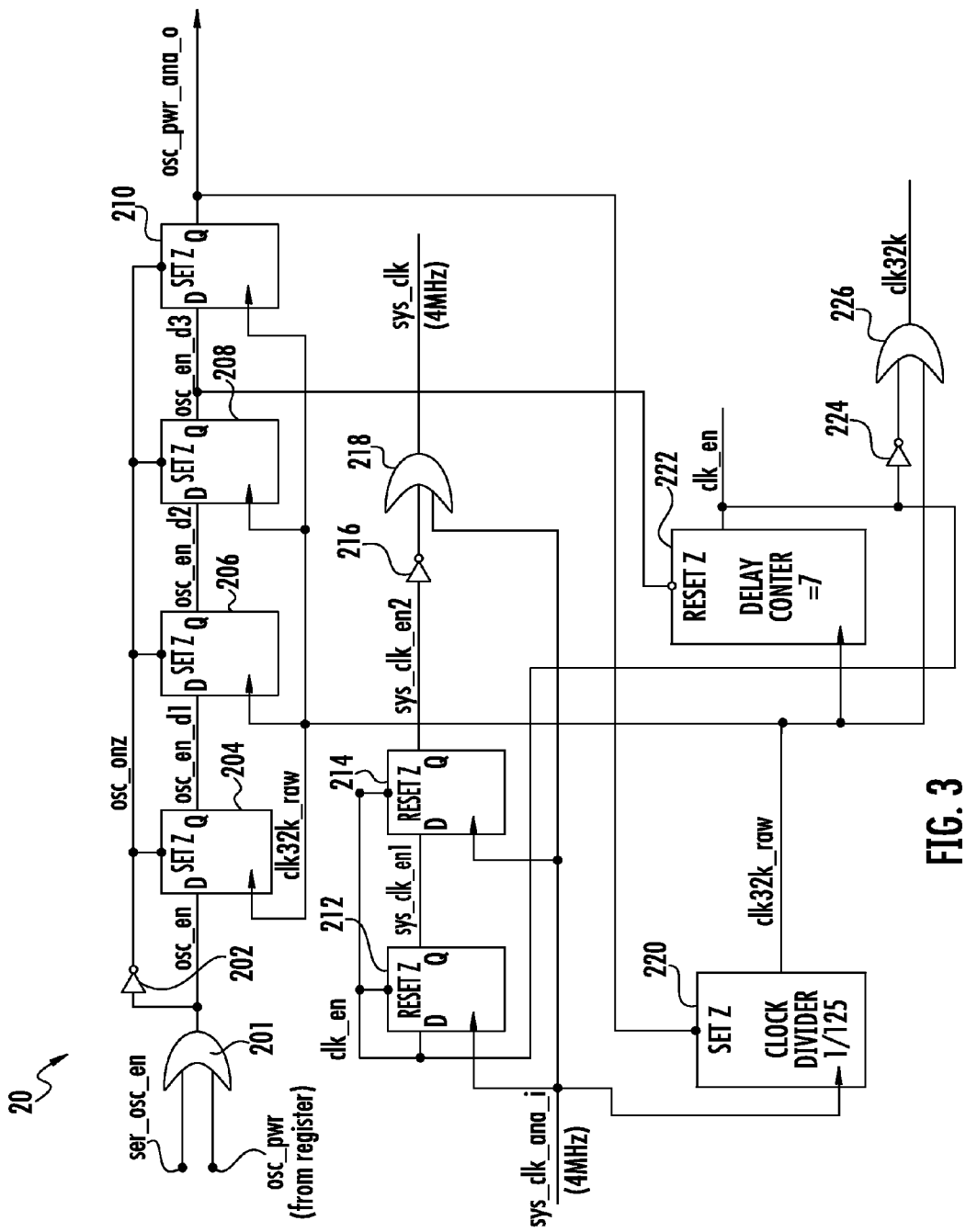
FIG. 3 is a schematic circuit diagram of a portion of the serial bridge controller of FIG. 1.

Referring now additionally to FIG. 3, the delay logic or circuitry 90 drives the clock into other digital circuits until the system clock frequency is stable. The delay circuitry 90 delays shutting down the system clock 11 for four 32 KHz clock cycles after the system clock is disabled.

Ser_osc_en is one input of OR gate 201. Osc_pwr is a bit from control and status circuitry 60. The host processor 70 can write to osc_pwr through the host serial interface 80 to set it to 1 or 0. When osc_pwr is set to 1, the oscillator clock 11 is enabled. When osc_pwr is clear to 0, the oscillator clock 11 is disabled if ser_osc_en is 0.

When either ser_osc_en or osc_pwr is 1, OR gate 201 output osc_en is 1 and asynchronously set flip-flops 204, 206, 208, 210 to 1 through inverter 202. The output of flip-flop 210 osc_pwr_ana_o is set to 1, and it enables the system clock 11. The system clock output is named as sys_clk_ana_i which is 4 MHz clock. Sys_clk_ana_i is the clock to drive the clock divider (1/125) 220, which divides a 4 MHz clock by 125 to create 32 KHz clock named clk32K_raw. Clk32K_raw is used to clock the delay counter 222. After count=7 32-KHz clock cycles, clk_en is set (clock output enable) to 1. When clk_en is 1, inverter 224 output is 0, and clk32K_raw passes through OR gate 226 clk32K. clk32K is used to drive other digital circuits that use the 32 KHz clock.

Clk_en is synchronized with flip-flops 212, 214 to set sys_clk_en2 (system clock output enable) to 1 after 2 sys_clk_ana_i clock cycles. When sys_clk_en2 is 1, inverter 216 output is 0 and it allows sys_clk_ana_i pass through OR gate 218 output sys_clk. Sys_clk is 4 MHz system clock and clk32K is divided down 32 KHz clock. Both sys_clk and clk32K are used in the system digital circuit except serial bus memory 15 and SPI slave controller 100.

When both ser_osc_en and osc_pwr is 0, osc_en is 0 and the output of flip-flop 210 osc_pwr_ana_o is 0 after 4 clk32K_raw clock cycles. When osc_pwr_ana_o is 0, the system clock 11 is shut down and sys_clk_ana_i stops running.

One 32-KHz clock cycle before shut down of the system clock 11, osc_en_d3 is set to 0, which asynchronously resets clk_en to 0. When clk_en is 0, clk32K stops running and stays high. When clk_en is 0, sys_clk (4 MHz clock) stops running and stays high after two sys_clk_ana_i clock cycles through the synchronization flip-flops 212, 214. When the system clock 11 sys_clk_ana_i is not needed, it is shut down to save power.

Figure 4:
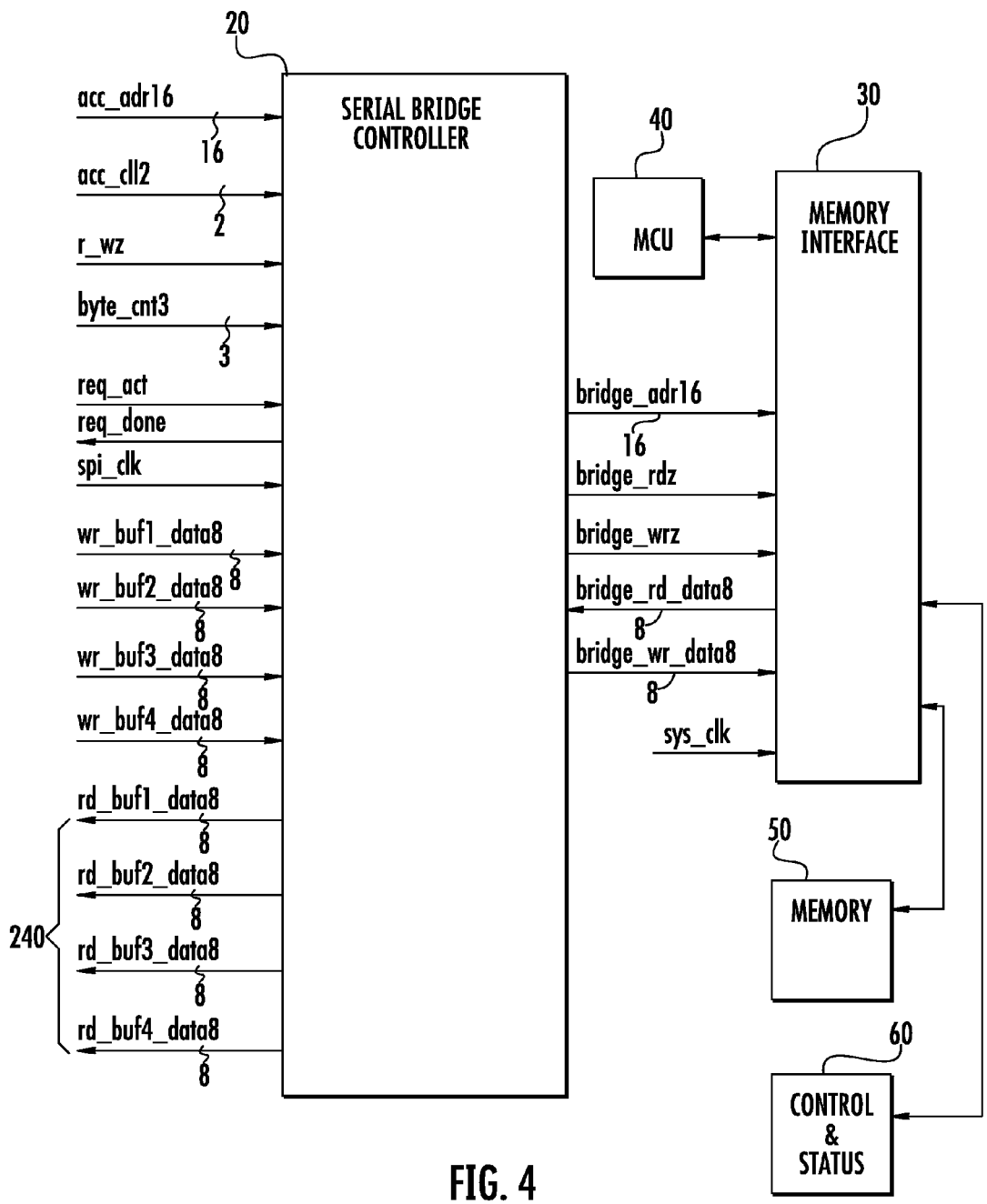
FIG. 4 is a schematic circuit diagram of another portion of the serial bridge controller of FIG. 1.

Referring now to FIG. 4, interface signals for the serial bridge controller 20 are described. The serial bridge controller 20 is a bridge controller to communicate with serial bus memory 15 and the memory interface 30.

The serial bridge controller 20 receives a request command from the serial bus memory 15, which provide request information. Acc_adr16 is the 16-bit memory 50 or control and status circuitry 60 access address. Acc_ctl2 is a 2-bit access control which is defined as a 16 bit or 8 bit address or EEPROM memory access or EEPROM test register access. R_wz is used to indicate a read or write request. If R_wz is 1, it is read request. If R_wz is 0, it is write request. Byte_cnt3 is used to indicate the data transfer byte count. It supports up to 4 byte data transfer. The registers that make up the serial bus memory 15 include a 4 byte write data buffer, and the serial bridge controller 20 includes a 4 byte read data buffer. When req_act is 1, it indicates a new request from serial bus memory 15.

After the serial bridge controller 20 finishes the request, req_done is set to 1 for 1 sys_clk (4 MHz clock) clock cycle. Req_done is used to asynchronously clear req_act to 0, so that the host processor 70 can check if the request is done by reading the req bit (bit 3) of the command register. The host processor req read value is represented from req_d2 which is a synchronizer output. If req_d2 is 0, the serial bridge controller 20 finishes the request. If req_d2 is still 1, the request is still in processing. Spi_clk is the SPI clock 12. When the host serial interface 80 is idle, spi_clk stops. Wr_buf1_data8, wr_buf_2_data8, wr_buf3_data8, and wr_buf4_data8 are 4 byte write data buffers from the serial bus memory 15. Rd_buf1_data8, rd_buf2_data8, rd_buf3_data8 and rd_buf4_data8 are 4 byte read data buffers from the serial bridge controller 20.

The serial bridge controller 20 creates control and data signals to communicate with the memory interface 30. The memory interface 30 runs based upon a 4 MHz clock (sys_clk). Both the serial bridge controller 20 and the 8051 MCU 40 can initiate memory 50 or CSR circuitry 60 access, and the memory interface 30 handles arbitration. Bridge_adr16 is a 16-bit address to the memory interface 30. Bridge_rdz is an active low read request. Bridge_wrz is an active low write request. Bridge_rd_data8 is an 8-bit data read from the memory interface 30. Bridge_wr_data8 is an 8-bit data write to the memory interface 30. The memory interface 30 communicates with the 8051 MCU 40, memory 50 and CSR (control and status) circuitry 60. The 8051 MCU 40, memory interface 30, memory 50 and CSR circuitry 60 are running at the 4 MHz clock (sys_clk).

Figure 5:
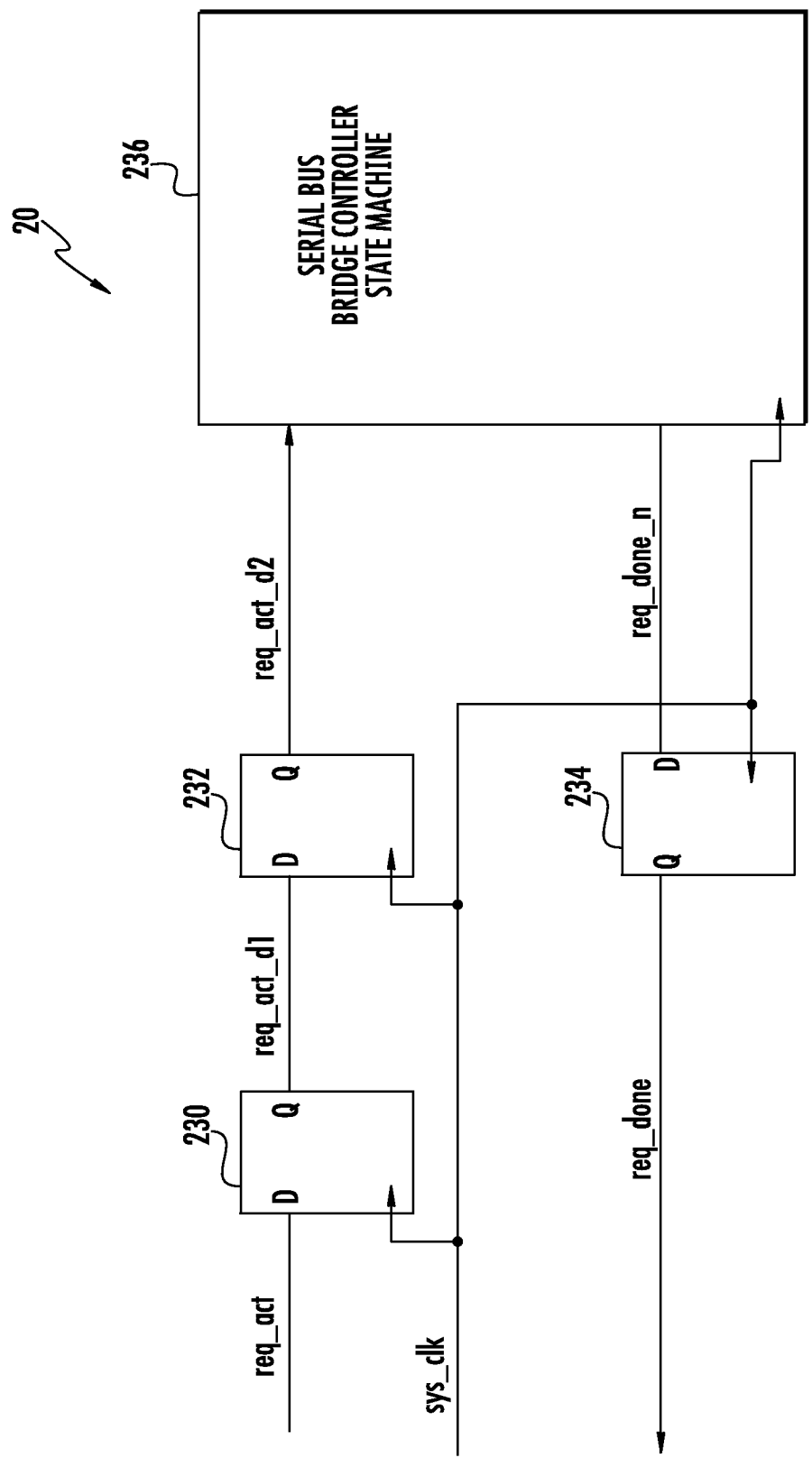
FIG. 5 is a schematic circuit diagram of another portion of the serial bridge controller of FIG. 1.

Referring now additionally to FIG. 5, a handshaking scheme within the serial bridge controller 20 is described. The serial bridge controller state machine 236 handles the host request process. Req_act from the serial bus memory 15 is synchronized to the sys_clk domain through flip-flops 230, 232. When req_act_d2 is 1, the serial bridge controller state machine starts processing the host request. After finishing the host request, req_done_n is set to 1 for one sys_clk clock cycle. Req_done_n is registered by sys_clk through flip-flop 234. The output of flip-flop 234 req_done is set to 1 for one sys_clk cycle after req_done_n is 1. The reason for registering req_done_n with a flip-flop is to create a relatively clean asynchronous reset signal to clear req to 0. Req is the Q output of flip-flop 106.

A method aspect is directed to a method of communicating between a microcontroller unit (MCU) 40 and a host processor 70. The method includes using a serial peripheral interface (SPI) slave controller 100 coupled to a serial bus memory 15, a host serial interface 80, and an SPI clock 12 coupled to the serial bus memory to generate a request active signal based upon a request for a transaction from the host processor 70. The request active signal causes each of a system clock 11 coupled to a serial bridge controller 20, the SPI clock 12, and the host serial interface 80 into an active state. The SPI slave controller 100 is used to store, based upon the request active signal, data corresponding to the request for the transaction from the host processor to the MCU 40 in the serial bus memory 15, and switch the host serial interface 80 to an inactive state based upon the data corresponding to the request for the transaction being stored. The serial bridge controller 20 is used to process the request for the transaction based upon the request active signal, and generate a request complete signal based upon the request for the transaction being processed. The SPI slave controller 100 is further used to switch the system clock 11 to the inactive state based upon the request complete signal. The SPI clock 12 is switched to the inactive state based upon the request complete signal.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device for communicating between a microcontroller unit (MCU) and a host processor, the electronic device comprising:
   a system clock configured to be switchable between an active state and an inactive state;
   an SPI clock configured to be switchable between an active state and an inactive state;
   a serial bridge controller coupled to said system clock;
   a serial bus memory coupled to said SPI clock;
   a host serial interface coupled to said serial bus memory and configured to be switchable between an active state and an inactive state; and
   an SPI slave controller coupled to said serial bus memory, said host serial interface, and said SPI clock and configured to
      generate a request active signal based upon a request for a transaction from the host processor, the request active signal causing each of said system clock, said SPI clock, and said host serial interface into the active state,
      store, based upon the request active signal, data corresponding to the request for the transaction from the host processor to the MCU in said serial bus memory, and
      switch said host serial interface to the inactive state based upon the data corresponding to the request for the transaction being stored, said serial bridge controller configured to
         process the request for the transaction based upon the request active signal, and
         generate a request complete signal based upon the request for the transaction being processed, said SPI slave controller configured to switch the system clock to the inactive state based upon the request complete signal, said SPI clock being switched to the inactive state based upon the request complete signal.

2. The electronic device of claim 1 wherein said SPI clock is switched to the inactive state based upon there being no further request for a transaction from the host processor.

3. The electronic device of claim 1 wherein said serial bridge controller comprises a plurality of sequential logic circuits coupled together and configured to generate the request complete signal based upon the request active signal and the system clock.

4. The electronic device of claim 1 wherein said serial bridge controller comprises delay circuitry configured to cooperate with said SPI slave controller to delay switching the system clock to the inactive state.

5. The electronic device of claim 4 wherein said delay circuitry comprises a system clock divider and a delay counter coupled thereto.

6. The electronic device of claim 5 wherein said system clock divider comprises a divide by X system clock divider, wherein X is a delay of the switching of the system clock to the inactive state in terms of system clock cycles.

7. The electronic device of claim 4 wherein the delay circuitry is configured to delay switching the system clock to the inactive state by a delay of greater than two clock cycles of said system clock.

8. The electronic device of claim 1 wherein said SPI slave controller comprises a plurality of sequential logic circuits coupled together.

9. The electronic device of claim 1 wherein said serial bridge controller is configured to process the request for the transaction based upon reading the request for the transaction from said serial bus memory.

10. An electronic device for communicating between a microcontroller unit (MCU) and a host processor, the electronic device comprising:
    a system clock configured to be switchable between an active state and an inactive state;
    an SPI clock configured to be switchable between an active state and an inactive state;
    a serial bridge controller coupled to said system clock;
    a serial bus memory coupled to said SPI clock;
    a host serial interface coupled to said serial bus memory and configured to be switchable between an active state and an inactive state; and
    an SPI slave controller coupled to said serial bus memory, said host serial interface, and said SPI clock and configured to
       generate a request active signal based upon a request for a transaction from the host processor, the request active signal causing each of said system clock, said SPI clock, and said host serial interface into the active state,
       store, based upon the request active signal, data corresponding to the request for the transaction from the host processor to the MCU in said serial bus memory, and
       switch said host serial interface to the inactive state based upon the data corresponding to the request for the transaction being stored, said serial bridge controller configured to
          process the request for the transaction based upon the request active signal based upon reading the request for the transaction from said serial bus memory, generate a request complete signal based upon the request for the transaction being processed, and process the request for the transaction said SPI slave controller configured to switch the system clock to the inactive state based upon the request complete signal, said SPI clock being switched to the inactive state based upon the request complete signal and there being no further request for a transaction from the host processor.

11. The electronic device of claim 10 wherein said serial bridge controller comprises a plurality of sequential logic circuits coupled together and configured to generate the request complete signal based upon the request active signal and the system clock.

12. The electronic device of claim 10 wherein said serial bridge controller comprises delay circuitry configured to cooperate with said SPI slave controller to delay switching the system clock to the inactive state.

13. The electronic device of claim 12 wherein said delay circuitry comprises a system clock divider and a delay counter coupled thereto.

14. The electronic device of claim 13 wherein said system clock divider comprises a divide by X system clock divider, wherein X is a delay of the switching of the system clock to the inactive state in terms of system clock cycles.

15. The electronic device of claim 12 wherein the delay circuitry is configured to delay switching the system clock to the inactive state by a delay of greater than two clock cycles of said system clock.

16. The electronic device of claim 10 wherein said SPI slave controller comprises a plurality of sequential logic circuits coupled together.

17. A method of communicating between a microcontroller unit (MCU) and a host processor, the method comprising:

using a serial peripheral interface (SPI) slave controller coupled to a serial bus memory, a host serial interface, and an SPI clock coupled to the serial bus memory to generate a request active signal based upon a request for a transaction from the host processor, the request active signal causing each of a system clock coupled to a serial bridge controller, the SPI clock, and the host serial interface into an active state, store, based upon the request active signal, data corresponding to the request for the transaction from the host processor to the MCU in the serial bus memory, and switch the host serial interface to an inactive state based upon the data corresponding to the request for the transaction being stored; and using the serial bridge controller to process the request for the transaction based upon the request active signal, and generate a request complete signal based upon the request for the transaction being processed, the SPI slave controller being further used to switch the system clock to the inactive state based upon the request complete signal, the SPI clock being switched to the inactive state based upon the request complete signal.

18. The method of claim 17 wherein using the SPI clock is switched to the inactive state based upon there being no further request for a transaction from the host processor.

19. The method of claim 17 wherein using the serial bridge controller comprises using a plurality of sequential logic circuits coupled together to generate the request complete signal based upon the request active signal and the system clock using.

20. The method of claim 17 wherein the using the serial bridge controller comprises using delay circuitry to cooperate with the SPI slave controller to delay switching the system clock to the inactive state.

* * * * *